United States Patent Office 3,755,363
Patented Aug. 28, 1973

---

3,755,363
CYCLIC CYANODITHIOIMIDOCARBONATE AND ITS PREPARATION
Richard V. Timmons, Marysville and Lawrence S. Wittenbrook, Columbus, Ohio, assignors to The O. M. Scott & Sons Company, Marysville, Ohio
No Drawing. Filed Sept. 12, 1966, Ser. No. 578,514
Int. Cl. C07c 69/00
U.S. Cl. 260—327 M    2 Claims

ABSTRACT OF THE DISCLOSURE

Compounds of the formula

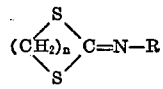

and methods of making and using them.

---

This invention relates to novel chemical compounds, and more specifically, to novel compounds having valuable growth regulating properties and to their preparation and use.

The compounds to which the present invention relates can be represented by the following general formulae.

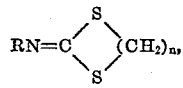    I wherein $n$ is 1, 2, or 3, and R is

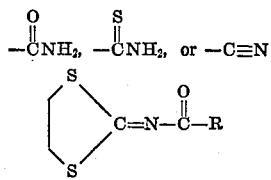    II wherein R is $$-O-R_1 \text{ or } -N-R_3$$
$$\quad\quad\quad\quad\quad\quad |$$
$$\quad\quad\quad\quad\quad\quad R_2$$

$R_1$ is $CH_3(CH_2)_m$ with $m$ being 0–5 or aryl; $R_2$ is $CH_3(CH_2)_m$ with $m$ being 0–5, aryl, or hydrogen; $R_3$ is $CH_3(CH_2)_m$ with $m$ being 0–5 when $R_2$ is $CH_3(CH_2)_m$ with $m$ being 0–5; $R_3$ is aryl when $R_2$ is aryl; and $R_3$ is aryl or hydrogen when $R_2$ is hydrogen;

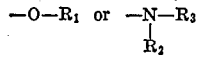    III wherein R is $CH_3(CH_2)_m$ with $m$ being 0–5, or aryl.

The compounds of the present invention may also be represented by the general formula

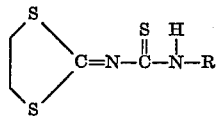

$n$ being 1, 2, or 3; R being $$-CN, \;\; -\overset{O}{\underset{\|}{C}}NH_2, \;\; \text{or} \;\; -\overset{S}{\underset{\|}{C}}NH_2$$

when $n$ is 1 or 3 and

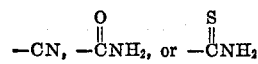

when $n$ is 2; $R_1$ being $$-O-R_3 \text{ or } -N-R_4$$
$$\quad\quad\quad\quad\quad\quad |$$
$$\quad\quad\quad\quad\quad\quad R_5$$

and $R_2$ being hydrogen, $CH_3(CH_2)_m$ with $m$ being 0–5, or aryl; $R_3$ being $CH_3(CH_2)_m$ with $m$ being 0–5 or aryl and $R_4$ being hydrogen, $CH_3(CH_2)_m$ with $m$ being 0–5, or aryl; $R_5$ being $CH_3(CH_2)_m$ when $R_4$ is $CH_3(CH_2)_m$ with $m$ being 0–5, aryl when $R_4$ is aryl, and aryl or hydrogen when $R_4$ is hydrogen.

Typical radicals $R_2$ include hydrogen and methyl; $R_3$ include n-hexyl, phenyl and chlorophenyl; $R_4$ include hydrogen, methyl and phenyl; $R_5$ include methyl, phenyl, nitrophenyl, chlorophenyl, dichlorophenyl and hydrogen.

The following are typical compounds of the present invention. The listing includes only representative, not all, compounds of the present invention.

Cyclic methylene cyanodithioimidocarbonate
Cyclic ethylene cyanodithioimidocarbonate
Cyclic propylene cyanodithioimidocarbonate
(2-(1,3-dithiolaneidene)) urea
2-(1,3-dithiolaneidene)) thiourea
1-phenyl-3-(2-(1,3-dithiolaneidene)) urea
1,1-dimethyl-3-(2-(1,3-dithiolaneidene)) urea
1-(2-chlorophenyl)-3-(2-(1,3-dithiolaneidene)) urea
1-(3-chlorophenyl)-3-(2-(1,3-dithiolaneidene)) urea
1-(4-chlorophenyl)-3-(2-(1,3-dithiolaneidene)) urea
1-(3,4-dichlorophenyl)-3-(2-(1,3-dithiolaneidene)) urea
1-(2-nitrophenyl)-3-(2-(1,3-dithiolaneidene)) urea
1,1-diphenyl-3-(2-(1,3-dithiolaneidene)) urea
1-phenyl-3-(2-(1,3-dithiolaneidene)) thiourea
n-Hexyl N-(2-(1,3-dithiolaneidene)) carbamate
Phenyl N-(2-(1,3-dithiolaneidene)) carbamate
3-chlorophenyl N-(2-(1,3-dithiolaneidene)) carbamate
4-chlorophenyl N-(2-(1,3-dithiolaneidene)) carbamate One of the important advantages of compounds disclosed herein, is that they are highly active growth regulators for a variety of biological systems and are substantially less expensive to prepare than other compounds with the same general properties.

From the foregoing it will be apparent that one important object of the present invention is to provide novel growth regulating compounds and compositions.

A related and also important object of the present invention is to provide growth regulating compounds and compositions which are substantially less expensive than those heretofore known with comparable properties.

In conjunction with the foregoing, another important object of this invention resides in the provision of novel processes for preparing the compounds of the invention.

A further important and related object of the present invention resides in the provision of novel methods of biological growth regulation which employ the compounds of the present invention.

Further objects and advantages and other novel features of the present invention will become obvious to those skilled in the arts to which this invention pertains from the following detailed description of exemplary embodiments of the invention and the appended claims.

Methods of preparing the compounds of this invention are set forth in the following examples in which all parts are parts by weight and all temperatures are expressed in degrees centigrade.

Type I compounds wherein $n$ is 2 or 3 can be prepared by reacting dipotassium cyanodithioimidocarbonate with a dibromoalkane having 2 or 3 carbon atoms as shown by the following equation:

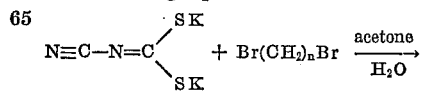

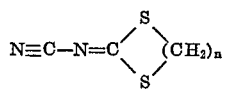

The reaction illustrated in the foregoing equation is described in more detail in the following example, which relates to the preparation of cyclic ethylene cyanodithioimidocarbonate.

EXAMPLE I

Preparation of cyclic ethylene cyanodithioimidocarbonate

A mixture of 19.4 parts of 1,2-dibromoethane in 4.1 parts of acetone was added dropwise, while stirring and under nitrogen, to a mixture of 20 parts of dipotassium cyanodithioimidocarbonate in 57.1 parts of acetone and 87.6 parts of water. The reaction mixture was stirred 21 hours under nitrogen at room temperature as a precipitate slowly formed. The mixture was then diluted with 299 parts of ice water and filtered, and the solid was recrystallized to give previously unknown cyclic ethylene cyanodithioimidocarbonate.

The cyclic ethylene cyanodithioimidocarbonate (M.P. 79–81°) prepared by this novel process was found to have the following elemental analysis:

Calculated for $C_4H_4N_2S_2$ (percent): C, 33.31; H, 2.80; S, 44.47. Found (percent): C, 33.90; H, 2.79; S, 44.96.

Cyclic propylene cyanodithioimidocarbonate (M.P. 99–102°) prepared by the same novel process was found to have the following elemental analysis:

Calculated for $C_5H_6N_2S_2$ (percent): C, 37.95; H, 3.82; S, 40.53. Found (percent): C, 37.78; H, 3.51; S, 40.60.

Cyclic methylene cyanodithioimidocarbonate, a type I compound, can be prepared by reacting dipotassium cyanodithioimidocarbonate with methylene iodide as shown in the following equation:

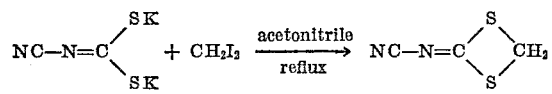

Preparation of cyclic methylene cyanodithioimidocarbonate is illustrated in greater detail in the following example:

EXAMPLE II

Preparation of cyclic methylene cyanodithioimidocarbonate

Twenty-seven and six-tenths (27.6) parts of methylene iodide was added dropwise to a suspension of 20 parts of dipotassium cyanodithioimidocarbonate in 80.4 parts of acetonitrile. The suspension was stirred 1 hour at room temperature and refluxed 18 hours. The hot acetonitrile solution was decanted; and the residue was treated with 20.1 parts of hot acetonitrile, which was combined with the decantate. The acetonitrile was then evaporated and the residue dissolved in acetone. The acetone solution was stirred with charcoal, and ether was added to precipitate a high-melting point solid. After filtration, the acetone ether was evaporated from the filtrate and the residue recrystallized to give the previously unknown cyclic methylene cyanodithioimidocarbonate.

The cyclic methylene cyanodithioimidocarbonate (M.P. 154–160°) prepared by this novel process was found to have the following elemental analysis:

Calculated for $C_3H_2N_2S_2$ (percent): C, 27.67; H, 1.55; N, 21.52; S, 49.26. Found (percent): C, 27.68; H, 1.58; N, 21.20; S, 49.04.

(2-(1,3-diethiolaneidene)) urea, a typical type I urea compound, can be prepared by either of the syntheses represented by the following equations:

(A)

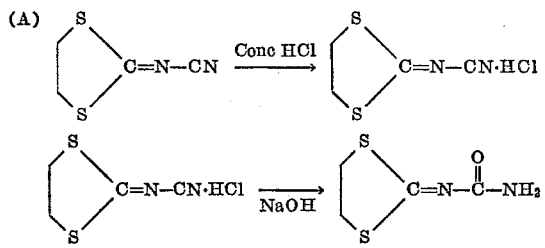

(B)

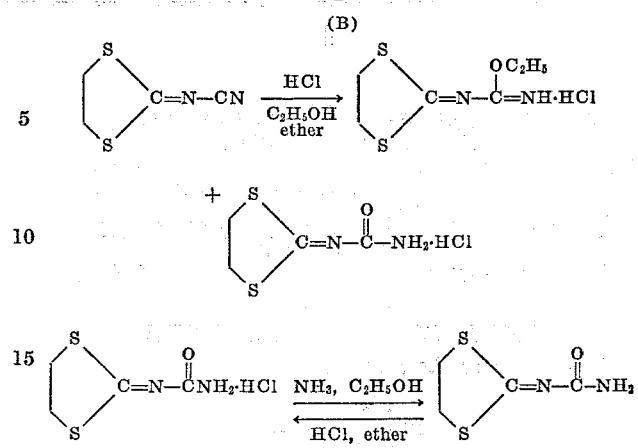

Preparation of (2-(1,3-dithiolaneidene)) urea by the processes represented by the foregoing equations is described in detail in Examples III and IV below.

EXAMPLE III

Preparation of (2-(1,3-dithiolanediene)) urea by Process (A)

Twenty (20) parts of cyclic ethylene cyanodithioimidocarbonate was stirred with 219 parts of concentrated hydrochloric acid. After 20 minutes the reaction mixture became homogeneous, and the temperature rose to 38°. After standing overnight, the solution was evaporated at 60°. The residue was stirred with 88.1 parts of water and just neutralized with 53.7 parts of 10% sodium hydroxide. The neutralized mixture was refrigerated, filtered, and recrystallized to give previously unknown (2-(1,3-dithiolaneidene)) urea.

The (2-(1,3-dithiolaneidene)) urea (M.P. 157–161°) prepared by this novel process was found to have the following elemental analysis:

Calculated for $C_4H_6N_2OS_2$ (percent): C, 29.60; H, 3.73; S, 39.53. Found (percent): C, 30.03; H, 3.68; S, 39.58.

EXAMPLE IV

A mixture of 20 parts of cyclic ethylene cyanodithioimidocarbonate, 6.7 parts of absolute ethanol, and 68.8 parts of anhydrous ether was placed in a flask which had previously been dried and swept with nitrogen. The flask was cooled to 0°, and the temperature was held at 0° while HCl gas was passed through the mixture. After 3 hours the ice bath was removed and the HCl passed through the mixture for another 4 hours. The reaction mixture was stirred overnight under nitrogen. The fine solid which had formed was rapidly filtered off, washed with dry ether, and placed in a desiccator over powdered $P_2O_5$ and NaOH pellets for 50 hours.

A suspension of 20 parts of the above-obtained product and 1.6 parts of ammonia in 20.9 parts of absolute ethanol was stirred first in an ice bath and then three days at room temperature. The reaction mixture was boiled with 139.6 parts of ethanol and was then filtered hot. The filtrate was treated similarly with another 139.6 parts of ethanol to obtain additional product. The ethanol was then evaporated, and the two solids were combined and recrystallized from ethanol.

The product obtained from this novel process was previously unknown (2-(1,3-dithiolaneidene)) urea.

Other type II compounds can be prepared by the process illustrated in the following equations:

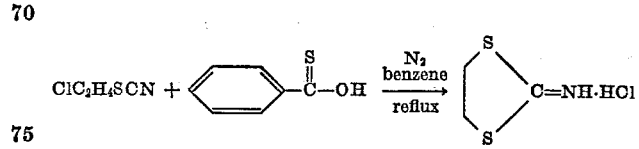

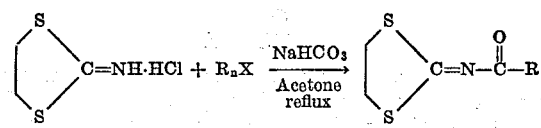

wherein R is as described above for type II compounds, $n$ is 1 or 2, and X is isocyanate, chloroformate, or carbamoyl chloride.

Preparation of a type II compound by the foregoing process is illustrated in greater detail in the following example.

EXAMPLE V

Preparation of 1-phenyl-3-(2-(1,3-dithiolaneidene)) urea

A solution of 20 parts of 2-chloroethyl thiocyanate and 44.8 parts of thiolbenzoic acid in 115 parts of sodium dried benzene was refluxed 45 minutes under sulfuric acid dried nitrogen. The reaction mixture was cooled and filtered to give a crude product. This was dissolved in water and reprecipitated with acetone to give 2-imino-1,3-dithiolane hydrochloride.[1]

A suspension of 20 parts of 2-imino-1,3-dithiolane hydrochloride, 15.3 parts of phenyl isocyanate, and 32.3 parts of sodium bicarbonate in 121.8 parts of acetone was refluxed 4 hours. As soon as the temperature reached around 40°, gas evolution was observed. The reaction mixture was cooled and filtered. The solid was washed with 384.6 parts of water, and the water insoluble portion was combined with a precipitate formed when the acetone filtrate was poured into 512.8 parts of water to give the combined crude product. This product was recrystallized to give previously unknown 1-phenyl-3-(2-(1,3-dithiolaneidene)) urea.

The foregoing process can be employed to prepare the (2-(1,3-dithiolaneidene)) ureas listed in the following table by substituting the indicated parts of isocyanates for the phenyl isocyanate employed in Example V.

TABLE 1

| Components | Parts by weight | (2-(1,3-dithiolaneidene)) urea |
|---|---|---|
| 2-chlorophenyl isocyanate | 19.7 | 1-(2-chlorophenyl)-3-(2-(1, 3-dithiolaneidene)) urea. |
| 3-chlorophenyl isocyanate | 19.7 | 1-(3-chlorophenyl)-3-(2-(1, 3-dithiolaneidene)) urea. |
| 4-chlorophenyl isocyanate | 19.7 | 1-(4-chlorophenyl)-3-(2-(1, 3-dithiolaneidene)) urea. |
| 3,4-dichlorophenyl isocyanate. | 24.1 | 1-(3,4-dichlorophenyl)-3-(2-(1, 3-dithiolaneidene)) urea. |
| 2-nitrophenyl isocyanate | 21.0 | 1-(2-nitrophenyl)-3-(2-(1, 3-dithiolaneidene)) urea. |

This process can also be used to prepare the (2-(1,3-dithiolaneidene)) ureas listed in Table 2 below by employing 43.1 rather than 32.2 parts of sodium bicarbonate and by substituting one of the chlorides or chloroformates listed in the table in the parts indicated for the phenyl isocyanate employed in Example V.

[1] An alternative preparation of 2-imino-1,3-dithiolane hydrachloride from cyanogen chloride and 1,2-ethanedithiol has been described by R. W. Addor, J. Org. Chem. 29, 738 (1964).

TABLE 2

| Component | Parts by weight | 2-(1,3-dithiolaneidene) |
|---|---|---|
| Dimethylcarbamoyl chloride | 13.8 | 1, 1-dimethyl-3-(2-(1,3-dithiolaneidene)) urea. |
| Diphenylcarbamoyl chloride | 29.7 | 1, 1-diphenyl-3-3(2-(1,3-dithiolaneidene)) urea. |
| n-Hexyl chloroformate | 21.1 | n-Hexyl N-(2-(1,3-dithiolaneidene)) carbamate. |
| Phenyl chloroformate | 20.1 | Phenyl N-(2-(1,3-dithiolaneidene)) carbamate. |
| 3-chlorophenyl chloroformate | 24.5 | 3-chlorophenyl N-(2-(1, 3-dithiolaneidene)) carbamate. |
| 4-chlorophenyl chloroformate | 24.5 | 4-chlorophenyl N-(2-(1,3-dithiolaneidene)) carbamate. |

The compounds identified in Example V and Tables 1 and 2 were found to have the following elemental analyses and melting points.

TABLE 3

| Compound | Empirical formula | Calculated C | Calculated H | Calculated S | Found C | Found H | Found S | M.P., degrees |
|---|---|---|---|---|---|---|---|---|
| 1-phenyl-3-(2-(1,3-dithiolaneidene)) urea | $C_{10}H_{10}N_2OS_2$ | 50.40 | 4.23 | 26.91 | 50.02 | 4.06 | 27.16 | 171-178 |
| 1,1-dimethyl-3-(2-(1,3-dithiolaneidene)) urea | $C_6H_{10}N_2OS_2$ | 37.87 | 5.29 | 33.70 | 37.67 | 5.28 | 33.55 | 66-62 |
| 1-(2-chlorophenyl)-3-(2-(1,3-dithiolaneidene)) urea | $C_{10}H_9ClN_2OS_2$ | 44.03 | 3.32 | 23.50 | 43.61 | 3.02 | 24.09 | 150-153 |
| 1-(3-chlorophenyl)-3-(2-(1,3-dithiolaneidene)) urea | $C_{10}H_9ClN_2OS_2$ | 44.03 | 3.32 | 23.50 | 44.10 | 3.11 | 23.75 | 135-136 |
| 1- 4-chlorophenyl)-3-(2-(1,3-dithiolaneidene)) urea | $C_{10}H_9ClN_2OS_2$ | 44.03 | 3.32 | 23.50 | 44.99 | 3.50 | 24.25 | 191-193 |
| 1-(3,4-dichlorophenyl)-3-(2-(1,3-dithiolaneidene)) urea | $C_{10}H_8Cl_2N_2OS_2$ | 39.09 | 2.62 | 23.08 | 38.60 | 2.69 | 21.48 | 191-192 |
| -((2-nitrophenyl)-3-(2-(1,3-dithiolaneidene)) urea | $C_{10}H_9N_3O_3S_2$ | 42.39 | 3.20 | 22.63 | 42.61 | 3.49 | 23.06 | 168-171 |
| n,1-diphenyl-3-(2-(1,3-dithiolaneidene)) urea | $C_{16}H_{14}N_2OS_2$ | 61.12 | 4.49 | 20.40 | 60.76 | 4.11 | 20.03 | 191-192 |
| 11-Hexyl N-(2-(1,3-dithiolaneidene)) carbamate | $C_{10}H_{17}NO_2S_2$ | 48.55 | 6.93 | 25.92 | 47.98 | 6.99 | 25.44 | Liquid |
| Phenyl N-(2-(1,3-dithiolaneidene)) carbamate | $C_{10}H_9NO_2S_2$ | 50.19 | 3.79 | 26.80 | 49.56 | 4.46 | 27.13 | 110-111 |
| 3-chlorophenyl N-(2-(1,3-dithiolaneidene)) carbamate | $C_{10}H_8ClNO_2S_2$ | 43.87 | 2.95 | 23.43 | 43.46 | 2.97 | 23.87 | 128-129 |
| 4-chlorophenyl N-(2-(1,3-dithiolaneidene)) carbamate | $C_{10}H_8ClNO_2S_2$ | 43.87 | 2.95 | 23.43 | 43.63 | 3.09 | 26.36 | 136-138 |

1-phenyl-3-(2-(1,3-dithiolanediene)) thiourea, a type III compound, can also be prepared by the process of Example V. In preparing this compound, however 17.3 parts of phenyl isothiocyanate is substituted for the phenyl isocyanate employed in the synthesis described in Example V.

The novel 1 - phenyl - 3-(2 - (1,3 - dithiolaneidene)) thiourea prepared by this process had a melting point of 117–119° and the following elemental analysis:

Calculated for $C_{10}H_{10}N_2S_3$ (percent): C, 47.21; H, 3.96; S, 37.81. Found (percent): C, 46.64; H, 4.05; S, 39.08.

(2-(1,3-dithiolaneidene)) thiourea, a type I compound, can be prepared by reacting cyclic ethylene cyanodithioimidocarbonate with thioacetic acid as shown by the following equation and by Example VI below.

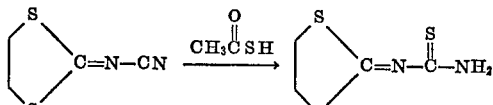

EXAMPLE VI

Preparation of (2-(1,3-dithiolaneidene)) thiourea

A suspension of 20 parts of cyclic ethylene cyanodithioimidocarbonate and 10.5 parts of thiolacetic acid (dried with $MgSO_4$) in 141.6 parts of anhydrous ether was cooled in an ice bath to 0° under nitrogen, and hydrogen chloride gas (dried by passing through concentrated $H_2SO_4$) was bubbled through the suspension for 3 hours at 0°. The color of the suspended solid changed from white to bright yellow. The reaction mixture was allowed to stand overnight. The solid was then filtered off, washed with 1100 parts of ethyl ether and purified by dissolving in 5% NaOH and reprecipitating with 3 M HCl to give previously unknown (2-(1,3-dithiolaneidene)) thiourea.

The (2-(1,3-dithiolaneidene)) thiourea (M.P. 136–138°) prepared by this novel process was found to have the following elemental analysis:

Calculated for $C_4H_6N_2S_3$ (percent): C, 26.94; H, 3.39; S, 53.95. Found (percent): C, 26.50; H, 3.54; S, 54.22.

The novel compounds of the present invention are growth regulators for a variety of biological systems as shown by the following examples.

EXAMPLE VII

The compounds disclosed herein have a high degree of pre-emergence herbicidal activity. To demonstrate this, ten parts of an exemplary compound, cyclic methylene cyanodithioimidocarbonate, 3 parts of polyoxyethylene sorbitan monolaurate (currently available as "Tween 20" from Atlas Chemical Industries), and 4 parts of denatured alcohol (currently available as "Synasol" from Union Carbide Chemical Company) were thoroughly mixed together with a micro mortar and pestle. This mixture was added to 1109 parts of denatured alcohol, and the resulting mixture was stirred into 5000 parts of sand. The sand mixture was stirred frequently at room temperature until dry. The granular composition was applied manually at the rate of 10 pounds per acre to flats sown with seeds of Poa pratensis (A), Digitaria sanguinalis (B), Poa annua (C), Barbarea spp (D), and Trifolium repens (E). Other flats similarly sown were left untreated as a comparative check. Twenty-one days after application percentage of control of germination was calculated using seeds in untreated flats as standards. The results are tabulated as follows:

TABLE 4

Compound—Cyclic methylene
cyanodithioimidocarbonate: Percent of kill

| | |
|---|---|
| A | 97 |
| B | 98 |
| C | 100 |
| D | 100 |
| E | 100 |

As shown by Table 4, cyclic methylene cyanodithioimidocarbonate, a typical compound of the present invention, possesses outstanding pre-emergence herbicidal activity.

EXAMPLE VIII

The compounds of the present invention also demonstrate a high degree of post-emergence herbicidal activity. This is shown by the following test.

Spray compositions were used in the test. These were prepared in the following manner. Six and eight-tenths (6.8) parts of cyanodithioimidocarbonate for a five pound per acre rate, seven parts of polyoxyethylene sorbitan monolaurate, and 10 parts of denatured alcohol were thoroughly mixed together with a micro mortar and pestle. The mixture was then diluted with 5000 parts of water.

These spray compositions were applied with a sprayer to Poa pratensis (A), Digitaria sanguinalis (B), Poa annua (C), Amaranthus retroflexus (D), Barbarea spp (E), and Trifolium repens (F) when the first true leaves had appeared (approximately three weeks after sowing). Similar plants were left untreated as a comparative check. Twenty-one days after application percentage of kill was calculated using untreated plants as standards. The results are tabulated below.

TABLE 5

| Compound | Rate, pounds per acre | Percent of kill | | | | | |
|---|---|---|---|---|---|---|---|
| | | A | B | C | D | E | F |
| Cyclic propylene cyanodithioimido-carbonate | 5 | 20 | 18 | 3 | 100 | 93 | 68 |
| Cyclic methylene cyanodithioimido-carbonate | 5 | 100 | 100 | 100 | 18 | 95 | 55 |

The tabulated data shows that the tested compounds typical compounds of the present invention have a high degree of post-emergence herbicidal activity.

EXAMPLE IX

A high degree of nematocidal activity is also demonstrated by the compounds of the present invention. To show this, a solution of 5 parts of cyclic methylene cyanodithioimidocarbonate with 41 parts of polyoxyethylene sorbitan monolaurate in 5000 parts of distilled water was prepared. A solution of 41 parts of polyoxyethylene sorbitan monolaurate in 5000 parts of distilled water was prepared for use as a check.

Mixed populations of nematodes (Rhabditis and Panagrellus spp) were cultured on cellulose sponges and fed with potato broth. These were extracted by washing from the sponges, sieved, passed through Baermann apparatus to remove organic matter, and concentrated with Buchner funnels.

Test vials were filled two-thirds full of sand. One milliliter of nematode solution with approximately 100 nematodes in it was added to each vial. Two hundred fifty-five (255) parts of cyanodithioimidocarbonate solution was then added via a microliter syringe. Test vials similarly containing sand and nematocide solution were made up, and 255 parts of water-polyoxyethlyene sorbitan monolaurate solution containing no cyanodithioimidocarbonate was added as a comparative check. All vials were loosely capped, incubated at 70° for 48 hours, then poured into petri dishes and set aside for an additional 48 hours. Percentage of kill was calculated with a Tri-simplex Bausch and Lomb viewer using untreated vials as standards.

At a rate of 50 p.p.m. the cyclic methylene cyanodithioimidocarbonate killed 100% of the nematodes. The foregoing data shows that cyclic methylene cyanodithimido carbonate, a typical compound of the present invention possesses a high degree of nematocidal activity.

EXAMPLE X

Cyclic propylene cyanodithioimidocarbonate was found to give excellent selective control of bentgrass (Agrostis spp) in Kentucky bluegrass (Poa pratensis) turf. This selective herbicidal activity was shown by the following test.

Five (5) parts of cyclic propylene cyanodithioimidocarbonate and 5000 parts of water were thoroughly blended until a suspension was formed. The resulting suspension was sprayed on mature, actively growing Kentucky bluegrass and bentgrass turf at the rate of 5 pounds per acre. Similar turf was left untreated as a comparative check. Percentage of kill was calculated forty-eight days after application using untreated turf as a standard.

Cyclic propylene cyanodithioimidocarbonate effected a 65% of the bentgrass turf. Only a trace of kill was found on the Kentucky bluegrass turf.

EXAMPLE XI

The compounds of the present invention also possess a high degree of fungicidal activity. This is shown by the following test.

For a 0.1 pound of cyanodithioimidocarbonate per acre rate test, 1 part of cyanodithiomidocarbonate, 41 parts polyoxyethylene sorbitan monolaurate, 396 parts acetone, and 500 parts water were mixed together in a pestle.[2] A 0.2 milliliter portion of this mixture was mixed with 2.8 milliliters of water and 60 milliliters of nutritive agar. Twenty (20) ml. of the resulting mixture was poured into a petri dish and allowed to set. Three-sixteenth (3/16) inch plugs of Rhizoctonia solani (A), Helminthosphorium sativum (B) and Fusarium roseum (C) were placed on the agar mixture and incubated at 80°. Similar fungal plugs were placed on untreated agar as a comparative check. Seven days later percentage of kill was calculated using plugs on untreated agar as standards. The results are tabulated below.

---

[2] Appropriate variations were made in the proportions only in preparing the compositions for the 10 pound per acre tests.

TABLE 6

| Compound | Rate, pounds per acre | Percent of kill A | B | C |
|---|---|---|---|---|
| Cyclic ethylene cyanodithiomidocarbonate | 10 | 100 | 100 | |
| Cyclic propylene cyanodithiomidocarbonate | 0.1 | 98 | 98 | |
|  | 10 | 100 | 100 | 100 |
| (2-(1,3-dithiolaneidene)) urea | 0.1 | 86 | Trace | 46 |
| Phenyl N-(2-(1,3-dithiolaneidene))carbamate | 10 | 0 | 75 | 75 |
| Cyclic methylene cyanodithioimidocarbonate | 0.1 | 10 | 95 | 99 |
|  | 10 | 100 | 100 | 100 |
| 1,1-dimethyl-3-(2-(1,3-dithiolaneidene)) urea | 10 | 89 | 84 | 40 |

The foregoing data shows that the exemplary compounds, typical compounds of the present invention, possess a high degree of fungicidal activity, in many cases at the remarkably low application rate of only 0.1 pound per acre.

This invention may be embodied in other specific forms without departing from the spirit or essential characteristics thereof. The present embodiments are, therefore, to be considered in all respects as illustrative, and not restrictive, the scope of the invention being indicated by the appended claims rather than by the foregoing description; and all changes which come within the meaning and range of equivalency of the claims are, therefore, to be embraced therein.

What is claimed and desired to be secured by Letters Patent is:

1. Cyclic methylene cyanodithioimidocarbonate.
2. The process of preparing cyclic methylene cyanodithioimidocarbonate comprising the step of refluxing methylene iodide with dipotassium cyanodithiomidocarbonate in acetonitrile.

References Cited

UNITED STATES PATENTS

| | | | |
|---|---|---|---|
| 3,031,372 | 4/1962 | Brack | 167—33 |
| 2,547,724 | 4/1951 | Sundholm | 260—327 |
| 3,057,875 | 10/1962 | Brown | 260—327 |

OTHER REFERENCES

Warner-Juaregg et al.: Chemical Abstracts, vol. 53 (1953), pp. 340–1.

Burger: Medicinal Chemistry, Interscience Pub. Inc., New York, N.Y. p. 77 (1960).

Bennett: Transactions of the Faraday Soc. (1941), pp. 794–7.

JAMES A. PATTEN, Primary Examiner

U.S. Cl. X.R.

71—90; 424—277

UNITED STATES PATENT OFFICE
CERTIFICATE OF CORRECTION

Patent No. 3,755,363     Dated August 28, 1973

Inventor(s) Richard J. Timmons et al

It is certified that error appears in the above-identified patent and that said Letters Patent are hereby corrected as shown below:

The inventor Richard V. Timmons should be changed to --Richard J. Timmons--.

Table 3, 5th entry, "1-4" should be --1-(4--.

Table 3, 7th entry, "-((" should be --1-(--.

Table 3, 8th entry, "n,1" should be --1,1--.

Table 3, 9th entry, "11-Hexyl" should be --n-Hexyl--.

Table 3, 10th entry, "4.46" should be --4.26--.

Table 3,

Columns 5 & 6, 1st entry, "171-178" should be --171-173--.

Columns 5 & 6, 2nd entry, "66-62" should be --66-68--.

Columns 5 & 6, 3rd entry, "150-153" should be --150-152--.

Column 6, first line following Table 3, "dithiolanediene" to --dithiolaneidene--.

Signed and sealed this 16th day of April 1974.

(SEAL)
Attest:

EDWARD M.FLETCHER,JR.
Attesting Officer

C. MARSHALL DANN
Commissioner of Patents